(12) United States Patent
Delevski

(10) Patent No.: US 10,770,914 B2
(45) Date of Patent: Sep. 8, 2020

(54) DUAL CONTROL LOOP FOR CHARGING OF BATTERIES

(71) Applicant: C.E. Niehoff & Co., Evanston, IL (US)

(72) Inventor: Dimitar Delevski, Northbrook, IL (US)

(73) Assignee: C.E. Niehoff & Co., Evanston, IL (US)

( * ) Notice: Subject to any disclaimer, the term of this patent is extended or adjusted under 35 U.S.C. 154(b) by 0 days.

(21) Appl. No.: 16/180,694

(22) Filed: Nov. 5, 2018

(65) Prior Publication Data

US 2020/0144851 A1    May 7, 2020

(51) Int. Cl.
*H02J 7/14*    (2006.01)

(52) U.S. Cl.
CPC .................. *H02J 7/1423* (2013.01)

(58) Field of Classification Search
CPC ...................................... H02J 7/1423
USPC ................................. 320/134, 152
See application file for complete search history.

(56) References Cited

U.S. PATENT DOCUMENTS

| | | | | |
|---|---|---|---|---|
| 4,335,344 A * | 6/1982 | Gant | ........................ | H02J 7/16 320/164 |
| 5,623,197 A | 4/1997 | Roseman et al. | | |
| 5,652,501 A * | 7/1997 | McClure | ............... | H02J 7/0019 340/636.15 |
| 5,744,937 A | 4/1998 | Cheon | | |
| 6,014,013 A | 1/2000 | Suppanz et al. | | |
| 6,163,135 A | 12/2000 | Nakayama et al. | | |
| 6,218,804 B1 | 4/2001 | Toriyama et al. | | |
| 6,225,784 B1 | 5/2001 | Kinoshita et al. | | |
| 6,225,788 B1 | 5/2001 | Kouzu et al. | | |
| 6,229,285 B1 | 5/2001 | Ding | | |
| 6,252,373 B1 | 6/2001 | Stefansson et al. | | |
| 6,259,254 B1 | 7/2001 | Klang | | |
| 6,313,608 B1 | 11/2001 | Varghese et al. | | |
| 6,316,914 B1 | 11/2001 | Bertness | | |

(Continued)

FOREIGN PATENT DOCUMENTS

| | | |
|---|---|---|
| CN | 203674347 U | 6/2014 |
| GB | 2288928 A | 11/1995 |

(Continued)

OTHER PUBLICATIONS

Sep. 9, 2019—(GB) Examination Report—App GB1903583.1.
Apr. 8, 2020—(WO) WO & ISR—App. No. 10201705945S.

*Primary Examiner* — M Baye Diao
(74) *Attorney, Agent, or Firm* — Banner & Witcoff, Ltd.

(57) ABSTRACT

A system for generator-based charging of a battery module may include the battery module, a sensor located adjacent the battery module, a generator controller comprising a processor and a non-transitory memory device storing instructions. The battery modules include one or more battery types, such as lithium ion batteries. The generator controller analyzes one or more sensor signals received from the sensor, the signals associated with battery conditions including temperature, a current, a voltage, a state of charge, a state of health and the like. The generator controller calculates a generator current value for use in charging the battery module. Next, the generator controller may generate a control signal comprising a command that may cause the generator to provide a charging current having the current value. The control signal is generated using a first control loop associated with a battery voltage and a second control loop associated with a battery current.

20 Claims, 10 Drawing Sheets

(56) References Cited

U.S. PATENT DOCUMENTS

| | | | |
|---|---|---|---|
| 6,331,762 B1 | 12/2001 | Bertness | |
| 6,353,306 B1 | 3/2002 | Mixon | |
| 6,424,157 B1 | 7/2002 | Gollomp et al. | |
| 6,426,608 B2 | 7/2002 | Amano et al. | |
| 6,532,425 B1 | 3/2003 | Boost et al. | |
| 6,549,014 B1 | 4/2003 | Kutkut et al. | |
| 6,624,618 B2 | 9/2003 | Kernahan et al. | |
| 6,909,287 B2 | 6/2005 | Bertness | |
| 7,057,376 B2 | 6/2006 | Cook et al. | |
| 7,116,109 B2 | 10/2006 | Klang | |
| 7,129,675 B2 | 10/2006 | Brecht | |
| 7,352,154 B2 * | 4/2008 | Cook | H02J 7/1423 320/116 |
| 7,518,375 B2 | 4/2009 | Kim et al. | |
| 7,619,417 B2 | 11/2009 | Klang | |
| 7,622,929 B2 | 11/2009 | Tinnemeyer et al. | |
| 7,683,576 B2 | 3/2010 | Tien et al. | |
| 7,688,074 B2 | 3/2010 | Cox et al. | |
| 7,705,602 B2 | 4/2010 | Bertness | |
| 7,714,736 B2 | 5/2010 | Gielniak | |
| 7,928,690 B2 * | 4/2011 | Koch | H01F 7/0273 320/108 |
| 8,035,395 B2 | 10/2011 | Suzuki et al. | |
| 8,089,345 B2 | 1/2012 | Berglund et al. | |
| 8,120,329 B2 | 2/2012 | Asada | |
| 8,125,189 B2 * | 2/2012 | Formenti | H02J 7/027 320/134 |
| 8,129,940 B2 | 3/2012 | Abe | |
| 8,142,237 B2 | 3/2012 | Condamin et al. | |
| 8,148,949 B2 | 4/2012 | Oliveira et al. | |
| 8,198,900 B2 | 6/2012 | Bertness et al. | |
| 8,203,311 B2 * | 6/2012 | Takahashi | H01M 10/44 320/134 |
| 8,217,620 B2 | 7/2012 | Hanssen et al. | |
| 8,232,763 B1 | 7/2012 | Boot | |
| 8,234,087 B2 | 7/2012 | Majima | |
| 8,264,202 B2 | 9/2012 | Sahu et al. | |
| 8,305,034 B2 | 11/2012 | Rubio | |
| 8,306,690 B2 | 11/2012 | Bertness et al. | |
| 8,386,199 B2 | 2/2013 | Goff et al. | |
| 8,437,908 B2 | 5/2013 | Goff et al. | |
| 8,467,984 B2 | 6/2013 | Gering | |
| 8,476,864 B2 | 7/2013 | Ferre Fabregas et al. | |
| 8,536,825 B2 | 9/2013 | Kishiyama et al. | |
| 8,552,693 B2 | 10/2013 | Paryani | |
| 8,558,512 B2 | 10/2013 | Iles et al. | |
| 8,564,242 B2 | 10/2013 | Hansford et al. | |
| 8,581,548 B2 | 11/2013 | Goff et al. | |
| 8,624,560 B2 | 1/2014 | Ungar et al. | |
| 8,643,342 B2 | 2/2014 | Mehta et al. | |
| 8,653,787 B2 | 2/2014 | Cunanan et al. | |
| 8,674,654 B2 | 3/2014 | Bertness | |
| 8,754,614 B2 | 6/2014 | Paryani et al. | |
| 8,754,653 B2 | 6/2014 | Vonderhaar et al. | |
| 8,820,445 B2 | 9/2014 | Kikuchi | |
| 8,823,324 B2 | 9/2014 | Brandon, II | |
| 8,825,417 B1 | 9/2014 | Krolak et al. | |
| 8,872,516 B2 | 10/2014 | Bertness | |
| 8,878,483 B2 | 11/2014 | Darroman et al. | |
| 8,890,467 B2 | 11/2014 | Almquist et al. | |
| 8,890,480 B2 | 11/2014 | Vian et al. | |
| 8,897,943 B2 | 11/2014 | Sheidler et al. | |
| 8,932,086 B2 | 1/2015 | Thimon et al. | |
| 8,947,050 B2 | 2/2015 | Gale et al. | |
| 8,972,213 B2 | 3/2015 | Zhang et al. | |
| 8,975,886 B2 | 3/2015 | Shiek | |
| 9,026,347 B2 | 5/2015 | Gadh et al. | |
| 9,156,356 B2 | 10/2015 | Rini et al. | |
| 9,163,600 B2 | 10/2015 | Neet | |
| 9,197,089 B2 | 11/2015 | Choe et al. | |
| 9,199,543 B2 | 12/2015 | Brabec | |
| 9,214,822 B2 | 12/2015 | Hartley et al. | |
| 9,219,294 B2 | 12/2015 | Albsmeier et al. | |
| 9,236,748 B2 | 1/2016 | Barsukov et al. | |
| 9,260,031 B2 | 2/2016 | Ghosh et al. | |
| 9,276,416 B2 | 3/2016 | Kroenke et al. | |
| 9,296,302 B2 | 3/2016 | Birke et al. | |
| 2007/0182385 A1 | 8/2007 | Ueda et al. | |
| 2008/0071483 A1 | 3/2008 | Eaves | |
| 2009/0058373 A1 * | 3/2009 | Graovac | H02P 9/48 322/25 |
| 2009/0184692 A1 | 7/2009 | Owens, Jr. et al. | |
| 2009/0210736 A1 | 8/2009 | Goff et al. | |
| 2009/0259421 A1 | 10/2009 | Pop et al. | |
| 2009/0273320 A1 | 11/2009 | Ungar et al. | |
| 2009/0319209 A1 | 12/2009 | Lim | |
| 2010/0141210 A1 | 6/2010 | Shaffer, Jr. | |
| 2010/0179778 A1 | 7/2010 | Goff et al. | |
| 2010/0217551 A1 | 8/2010 | Goff et al. | |
| 2010/0292942 A1 | 11/2010 | Golf et al. | |
| 2011/0199054 A1 | 8/2011 | Burchardt et al. | |
| 2011/0248678 A1 | 10/2011 | Wade et al. | |
| 2012/0041622 A1 | 2/2012 | Hermann et al. | |
| 2012/0056585 A1 | 3/2012 | Mariels | |
| 2012/0098481 A1 | 4/2012 | Hunter et al. | |
| 2012/0105009 A1 | 5/2012 | Yao | |
| 2013/0090900 A1 | 4/2013 | Gering | |
| 2013/0127611 A1 | 5/2013 | Bernstein et al. | |
| 2013/0249468 A1 | 9/2013 | Bajjuri et al. | |
| 2013/0249469 A1 | 9/2013 | Pahlevaninezhad et al. | |
| 2013/0278225 A1 | 10/2013 | Dietze et al. | |
| 2014/0023888 A1 | 1/2014 | Fulop et al. | |
| 2014/0062415 A1 | 3/2014 | Barsukov et al. | |
| 2014/0203077 A1 | 7/2014 | Gadh et al. | |
| 2015/0077040 A1 | 3/2015 | Longdon et al. | |
| 2015/0097518 A1 | 4/2015 | Bishop et al. | |
| 2015/0168499 A1 | 6/2015 | Palmisano | |
| 2015/0191100 A1 | 7/2015 | Schindler | |
| 2015/0236523 A1 | 8/2015 | Takano et al. | |
| 2016/0006272 A1 | 1/2016 | Greening | |
| 2016/0052410 A1 | 2/2016 | Zhou | |
| 2016/0089994 A1 | 3/2016 | Keller et al. | |
| 2016/0107526 A1 | 4/2016 | Jin et al. | |
| 2016/0181838 A1 | 6/2016 | Bryngelsson et al. | |
| 2017/0077717 A1 | 3/2017 | Lundgren et al. | |
| 2017/0194887 A1 * | 7/2017 | Kataoka | H02K 19/26 |
| 2017/0264104 A1 | 9/2017 | Horitake et al. | |
| 2018/0026457 A1 | 1/2018 | Delevski | |

FOREIGN PATENT DOCUMENTS

| | | | |
|---|---|---|---|
| WO | 2014100937 A1 | 7/2014 | |
| WO | 2016009175 A1 | 1/2016 | |

\* cited by examiner

DUAL CONTROL LOOP FOR CHARGING OF BATTERIES

FIELD OF THE INVENTION

This application relates generally to generator-based charging of batteries and more particularly to use of a controller for controlling an output of a generator to charge one or more battery modules in a vehicle application using dual control loops.

BACKGROUND

Electrical devices and devices containing multiple electrical components have become increasingly reliant on batteries for power. In many applications (e.g., automotive power systems, vehicle power systems, portable electronics, etc.), rechargeable batteries may be used. Such rechargeable batteries may include one or more batteries in a battery module, such as lithium-ion batteries, nickel-cadmium batteries, lead-acid batteries, and/or other battery types or combination of battery types. In an illustrative example, lithium ion batteries have become increasingly common in many applications, such as portable electronics, vehicular electrical systems, and the like. Advantages of lithium ion batteries include a favorable energy to weight ratio, no memory effect, a low rate of charge loss when not in use, and the like. In some applications (e.g., vehicular applications, industrial applications, aerospace applications, etc.), lithium ion batteries may be chosen based on the above mentioned attributes and/or for other reasons, such as a high energy density, a high power density, and the like.

In traditional recharging applications for Li-ion batteries, a one-step (e.g., constant current) or two-step (constant current/constant voltage) charging process may be used. In an illustrative example, a two-step process may include first charging the battery using a constant current (e.g., a current limit) until the volt limit has been reached (e.g., a cell voltage limit). Next, a maximum voltage per cell may be applied until the charging current falls below a threshold level, such as a multiple of a rated discharge current ($I_d$) (e.g., $0.05*I_d$, $0.1*I_d$, $0.2*I_d$, etc.). For other battery chemistries, a same or different charging scheme may be utilized based on certain properties of the particular battery chemistry. For example, a lead acid battery may be charged by applying a constant voltage (e.g., a rated battery voltage) until the desired battery voltage has been reached.

In some cases, such as vehicular applications, industrial applications, etc., a battery charging system may be generator based. However, in some applications, the above-mentioned battery charging techniques may fail to efficiently charge batteries, or even may cause damage to battery modules because different environmental or electrical conditions may be overlooked. In other cases, a battery module may use mixed battery types, either as an intentional combination or an inadvertent combination. In such cases, a charging method for one battery type may actually damage or cause a failure of one or more components of the battery module. For example, a specialized battery charger may be used, but such use may increase costs associated with use of the battery module, increase weight of the battery module components and/or supporting equipment (e.g., the battery charger, etc.), increase system complexity (e.g., additional components that may be lost or damaged, etc.), and the like. As such, a need has been recognized for a generator-based system capable of efficiently charging a battery module without use of a separate battery charger.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

In an illustrative example, a system for generator-based charging of a battery module may include the battery module, a sensor located adjacent the battery module, a generator controller comprising a processor and a non-transitory memory device storing instructions. The battery modules include one or more battery types, such as lithium ion batteries. The instructions, when executed by the processor, cause the generator controller to analyze one or more sensor signals received from the sensor. The sensor signals may correspond to a condition and/or parameter associated with the battery module including a temperature, a current, a voltage, a state of charge, a state of health and the like. The generator controller may then calculate, based on the one or more sensor signals, a generator current value for use in charging the battery module. Next, the generator controller may generate a control signal comprising a command that may cause the generator to provide a charging current having the current value, where the control signal may be generated based on a first control loop associated with a battery voltage and a second control loop associated with a battery current.

The details of these and other aspects of the disclosure are set forth in the accompanying drawings and description below. Other features and advantages of aspects of the disclosure will be apparent from the description and drawings.

BRIEF DESCRIPTION OF THE DRAWINGS

Aspects of the disclosure may be implemented in certain parts, steps, and embodiments that will be described in detail in the following description and illustrated in the accompanying drawings in which like reference numerals indicate similar elements. It will be appreciated with the benefit of this disclosure that the steps illustrated in the accompanying figures may be performed in other than the recited order and that one or more of the steps may be optional. It will also be appreciated with the benefit of this disclosure that one or more components illustrated in the accompanying figures may be positioned in other than the disclosed arrangement and that one or more of the components illustrated may be optional, in which.

DETAILED DESCRIPTION

Figure 1:
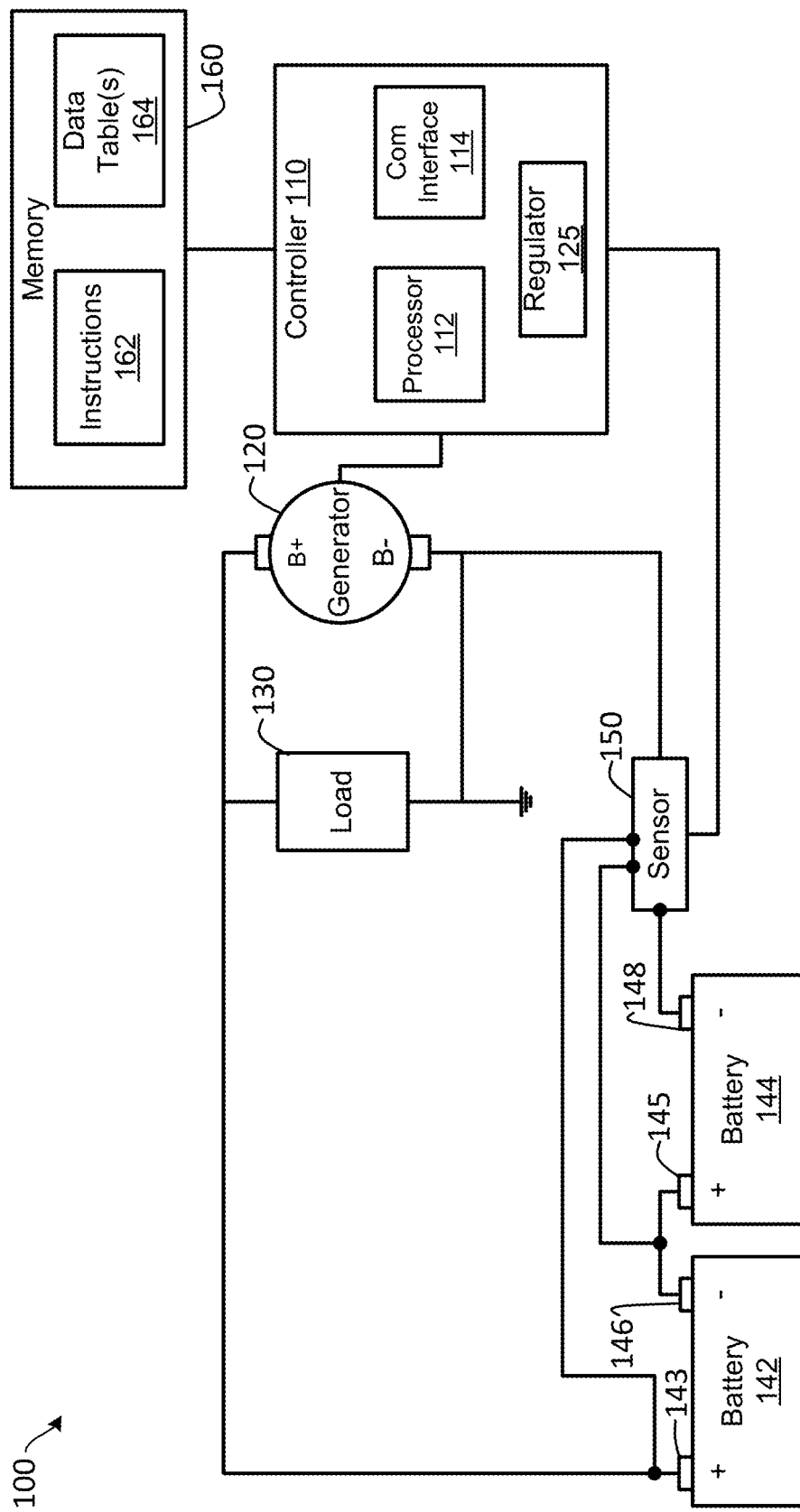
FIG. 1 shows an illustrative block diagram of a generator-based battery charging control system according to aspects of the disclosure.

Aspects of the present disclosure are directed toward closed loop control of battery charging by a generator. More specifically, the present disclosure is directed to control of charging of a battery or a plurality of batteries using a voltage control loop operating at a first frequency and a current control loop operating at a second frequency.

In the following description of various example structures and methods in accordance with the invention, reference is made to the accompanying drawings, which form a part hereof, and in which are shown by way of illustration various fitness devices and systems using fitness devices in accordance with various embodiments of the invention. Additionally, it is to be understood that other specific arrangements of parts and structures may be utilized and structural and functional modifications may be made without departing from the scope of the invention.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof, as well as additional items and equivalents thereof. As used in this description, a set refers to a collection of one or more elements.

In some cases, a battery charging system may control the charging voltage of a generator, such as an alternator of a vehicle using at least one charging profiles, each associated with charging various types of batteries and/or combinations of battery types. Such charging profiles may be combined, such as when a battery system includes of different battery types. An illustrative mixed-battery system may include one or more lithium ion battery modules connected in parallel with one or more lead acid battery modules. Each charging profile may be associated with a voltage and temperature (e.g., a voltage vs. temperature charging profile) or may be associated with a current limit (e.g., a current limited multistage charging profile). One of the main challenges utilizing such a strategy arises when limiting limit the charging current of a lithium ion battery because the lithium ion batteries have many restrictions. For example, an illustrative charging restriction of the lithium ion battery is that a maximum charging current depends on multiple factors including temperature, battery state of charge (SOC), battery state of health (SOH) and the like. When the current exceeds this maximum charging current limit, the battery may disconnect from the DC bus. As a result, the generator or alternator may be left in a battery-less operating mode, which may result in a greatly reduced power quality of the generated voltage. This reduced power quality may also cause other loads in the system (e.g., a vehicle electrical system) to change their operating behavior, to disconnect from the DC bus, and/or to be damaged.

Another challenge with lithium ion batteries is based on a state of charge of a lithium ion battery or battery module. For example, a lithium ion battery may disconnect from the DC bus when the battery reaches 100% of the SOC value. When this maximum SOC is reached, the battery may draw almost no charging current at a specified voltage. For example, an illustrative lithium ion battery may reach 100% SOC when the charging current drops below a specified current level (e.g., at about 0.5 Amps) at or above a specified charging voltage (e.g., about 30.0 Volts).

Another possible challenge with charging lithium ion batteries relates to an open circuit voltage (OCV) characteristic of this battery type. The OCV corresponds to a voltage at the battery terminals when the battery is disconnected from its loads. In an illustrative example, a controller may command an alternator voltage to fall below the OCV of a lithium ion battery being charged, such as when the controller follows a specified charging profile. Lithium ion batteries can maintain a certain voltage for long period of time even when large current (e.g., about 50 amps, about 100 amps, etc.) loads are connected. If the alternator voltage drops below the battery OCV, then the battery may remain at a higher voltage level for a long duration. In some cases, depending on the connected loads, a battery may be able to provide the necessary current load for hours. During this time, however, the alternator may shut down because the system voltage will be higher than the alternator set point and/or the DC bus due to the high energy density of the battery.

To overcome these noted issues, a need was recognized for innovative control strategies and/or algorithms to be implemented by a generator control system. For example, a second control loop may be integrated into the alternator control algorithm to limit the battery charging current, not by changing the alternator set point, but by limiting the alternator field excitation current. By controlling the field excitation current, better precision may be possible due to the higher resolution available for PWM control than for voltage control. Another control strategy may correspond to selecting a specified maximum limit for the alternator set point so the battery never reaches 100% SOC for the battery module being charged. For example, if a battery's defined 100% SOC set point is about 30.0 V, a maximum set point may be selected less than the value of the 100% SOC. In this illustrative example, a set point of about 29 V may be selected such that the battery's maximum reachable SOC may be limited to some percentage less than 100%, such as about 94-95% SOC. As such, the battery will never reach the 100% SOC and, thus, will not disconnect from the system due to this effect. Additionally, the controller selects a voltage set point for the alternator so that the output never drops below the current battery OCV. The OCV parameter is not a constant value because the battery OCV changes over time due to the charging/discharging cycles experienced by the battery. As the OCV set point changes, the controller ensures that the alternator set point never drops below that specific OCV.

While aspects of this disclosure may be discussed with reference to one or more specific battery types such as lithium ion batteries, the concepts may be applicable to charging any battery types.

FIG. 1 shows an illustrative block diagram of a generator-based battery charging system 100 according to aspects of the disclosure. For example, the generator-based battery charging system may include a controller 110, a generator 120, an electrical load 130 receiving electrical power from the generator 120, a battery module 140 electrically coupled to the generator, and one or more sensors (e.g., a "smart" sensor 150, individual sensors, etc.). In some cases, the controller 110 may include a communication interface 114 and a processor 112. In some cases, the controller 110 may also include one or more memory devices 160 (e.g., internal and/or external memory devices) that may be configured to store instructions 162 processed by the processor 112 and one or more data tables (e.g., parameter sets, charging profiles, etc.).

In some cases, the generator 120 may be electrically coupled to the electrical load via two or more electrical connections (e.g., B+, B−, etc.) to provide electrical power to the electrical load 130. In an illustrative example, the generator 120 may be an alternator in a vehicle. In some cases, the generator 120 may be a stand-alone electrical generator configured to utilize another energy source (e.g., a fossil fuel engine, a wind turbine, etc.) to provide electrical energy to the electrical load 130. The generator 120 may include a field coil (not shown) and one more stator windings (not shown), where the field coil may generate a magnetic field when a field current flows through the field coils. This magnetic field may interact with the one or more stator windings to induce a voltage across one or more stators. The stator voltage may then be used to provide a generator output current for use in powering the electrical load 130.

In an illustrative example, the generator 120 may be an alternator installed in a vehicle, such as an automobile, a truck, a bus, a military vehicle, an airplane, a boat, and/or the like. In such cases, the electrical load 130 may include one or more electrical components of the vehicle, such as a heating element, a cooling fan, headlights, an air conditioning unit, a pump, a radio, a battery module, and the like. In some cases, the vehicle alternator may also be used to provide power to one or more electrical devices (e.g., a portable electronic device, a mobile phone, a GPS unit, etc.) and/or external vehicle components (e.g., a trailer, running lights, emergency lights, etc.). Some vehicles, such as emergency vehicles, which may include a number of electrical components that cannot be without power. The battery module 140 may be used to provide electrical power to the electrical load 130, or externally connected electrical devices, when sufficient electrical power is not or cannot be generated by the generator 120. For example, the battery module 140 may provide electrical energy to the electrical load when the vehicle's engine has been shut down, when the generator 140 has experienced a fault, when the electrical load 130 has increased to or beyond the generation capacity of the generator 120, and the like. In some cases, the generator 120 may be configured with two or more electrical terminals (e.g., a B+ terminal, a B− terminal, a B2+ terminal, etc.) to provide electrical power at one or more voltage levels in a range between about 10V to about 80 V, such as via a 12 V output terminal, a 14 V output terminal, a 28 V output terminal, a 37 V output terminal, a 74 V output terminal and the like.

In another illustrative example, the generator 120 may be a stand-alone generator or other such generator for use outside a vehicular environment. In such cases, the generator 120 may be used in an industrial application, a residential application, a remote installation application, a lighting application, and the like. Such generators may include or be connected to a device (e.g., a fuel powered engine, a renewable energy powered motor, etc.) that provides a motive force to provide the mechanical energy to spin a rotor of the generator 120 to generate electrical power, as discussed above. In such cases, the generator 120 may be used to provide electrical power to a number of electrical devices and/or to provide power to be stored in one or more battery modules for use in providing power to an electrical device. For example, an electrical generator may be used to power an electrical device (e.g., a pump, a lighting unit, a computer installation, etc.) in locations remote from an electrical grid connection, at a location in which electrical power delivery has periods of outages, or in application in which electrical power is critical, such as at a hospital or other similar healthcare facility.

In some cases, the generator 120 may be configured to generate alternating current (AC) voltages at a frequency corresponding to the rotation speed of the rotor. In many cases, this electrical energy is output as a rectified direct current (DC) voltage (e.g., via the B+ and B− terminals). In some cases, the generator 120 may be configured to output an AC voltage at a regulated frequency in addition to or in place of the DC output voltage, such as a 120V output at 60 Hz, 220V output at 50 Hz, and the like. To provide regulated DC voltages, the generator-based battery charging system 100 and/or the generator 120 may include a voltage regulator. The voltage regulator may operate to regulate the generator output voltage(s) at one or more pre-defined constant voltage levels as the speed of the generator 120 and electrical load 130 may vary during operation. For example, electrical devices included in the electrical load may be connected, disconnected, enabled, or disabled during operation of the generator 120. This variable load operation may cause disturbances (e.g., a voltage spike, a transient current, etc.) as the devices operate. In an illustrative example, a motor or heating element connected as at least a portion of the electrical load 130 may draw a large inrush current upon power up. These transient load conditions may affect the operation of the generator 120. Additionally, in vehicular operations, the rotation speed of the rotor may correspond to the rotational speed of the vehicle's engine, where this variable rotational speed may cause the AC voltage generated via the interaction between the field coils and the rotor to be generated at a frequency with some variation. In such cases, the voltage regulator may be used to regulate the conversion of AC electrical energy to DC electrical energy at or near a predefined set point. In some cases, the regulator 125 may be incorporated into the generator 120, incorporated into the controller 110 as shown, or may be incorporated as an external device installed adjacent to the generator 120. In some cases, the regulator 125 may be configured to provide the regulated output voltage from the generator 120 via the B+ and B− terminals.

In some cases, the regulator may include one or more power electronic devices such as diodes, thyristors, silicon controlled rectifiers (SCRs), gate turn-on thyristors (GTOs), Triacs, bipolar junction transistors (BJTs), power transistors (e.g., insulated gate bipolar transistors (IGBTs), power metal oxide semiconductor field-effect transistors (MOSFETs), MOS controlled thyristors (MCTs), integrated gate-commutated thyristors (IGCT), and the like. The voltage regulator may include one or more converters, such as AC/DC converters, DC/DC converters and the like. For example, the regulator may include a diode rectifier to convert an AC input voltage to an unregulated DC voltage and a DC/DC regulator to convert the unregulated DC voltage to a regulated DC output voltage and/or current. In some cases, the regulator 125 may control an AC/DC converter to provide a regulated DC output voltage and/or current. The regulator 125 may be configured to switch one or more switching devices (e.g., an IGBT, a BJT, an SCR, an IGCT, etc.), along with additional electrical components (e.g., resistors, capacitors, inductors, transformers, etc.) to provide a regulated DC output via one or more power conversion circuits, such as a boost converter, a buck converter, a CA converter, a flyback converter, a SEPIC converter, a forward converter, a full bridge converter, and the like.

In some cases, the controller 110 may be configured to control an output (e.g., a voltage, a current, both a voltage and a current) of the generator. For example, the controller 110 may store instructions 162 in one or more non-transitory memory devices to be processed by the processor 112 to control the output of the generator at a desired set-point. In some cases, the instructions 162 may cause the output of the generator to change over time based on feedback received at the controller via the communication interface 114. The one or more non-transitory memory devices 160 may be any suitable storage, including, but not limited to RAM, ROM, EPROM, flash memory, a hard drive, and so forth. In some cases, the instructions 162 and/or the data tables 164 may be pre-loaded on the memory devices 160. In some cases, at least a portion of the instructions 162 and/or the data tables 164 may be loaded into memory using one or more communication channels (e.g., a serial communication connection, a parallel communication connection, a network communication connection, a wireless communication network, etc.) via the communication interface 114. The communication interface 114 may include one or more network connections, one or more inputs for receiving sensor signals from the sensor 150, a communication interface for communicating data to and/or from the sensor, a command output to facilitate communication of a control signal to the generator to control operation of the generator, and/or one or more parallel, serial or network ports to allow a user to upload and/or download information and/or instructions into the memory 160.

One or more aspects of the disclosure may be embodied in computer-usable data or computer-executable instructions (e.g., the instructions 162), such as in one or more modules, executed by the processor 112 to perform the operations described herein. Generally, modules include routines, programs, objects, components, data structures, and the like that perform particular operations or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein. In some cases, the data tables 164 may be stored as data structures (e.g., a tabular data structure), an XML file, a binary file, and/or the like.

As will be discussed below with respect to FIG. 7, the processor 112 may process instructions 162 to regulate charging of the rechargeable battery module 140 based on battery module information and information from the sensor 150 (e.g., a battery voltage, a battery current, a battery temperature, an ambient temperature, historical battery operation data, and the like.). In an illustrative example, the processor 112 may process instructions 162 that may cause the controller 110 to monitor conditions related to the battery module operation, such as a state of charge (SOC) of the battery module 140, battery voltage, battery current, battery temperature, ambient temperature, and the like. Based on this information, the controller 110 may determine that the battery module conditions have met predetermined criteria for initiating a recharge-operation sequence. Such predetermined criteria may be stored in the memory 160 as a data table 164, a data structure, or the like. For example, a state of charge criteria may correspond to a threshold percentage of the maximum capacity of the battery module, under which the controller 110 may initiate the recharge of the battery module 140. For example, the state of charge threshold may be a predetermined percentage of maximum capacity, such as 5%, 10%, 20%, 40% and the like. Similarly, the predetermined criteria may correspond to a depth of discharge (DOD) threshold condition, where the depth of discharge threshold may correspond to a percentage of battery capacity that has been discharged and expressed as a percentage. For example, the DOD threshold may be a predetermined percentage of discharge battery capacity, such as 95%, 90%, 80%, and the like. Other battery parameters that may be used by the controller 110 when to initiate a battery recharge operation may include a terminal voltage threshold that may correspond to SOC and the charging/discharge current, an open-circuit voltage threshold which may correspond to SOC and/or an internal resistance threshold which may correspond to SOC. For example, as internal resistance increases the battery efficiency may decrease and thermal stability may be reduced as more of the charging energy may be converted to heat. In some cases, the predetermined criteria may also be dependent upon other parameters that may be sensed in near-real time, such as temperature, voltage and current. For example, first threshold values may be used at a first temperature and second threshold values may be used at a second temperature.

Once the controller 110 identifies whether recharge criteria has been met (e.g., a SOC threshold, a DOD threshold, a voltage threshold, a current threshold, a temperature threshold, and/or an internal resistance threshold, etc.), the controller 110 may identify a charging profile for use in controlling the battery recharge process. The charging profile may be stored in the memory device as a table, xml file, data structure and the like. Each charging profile may depend on a battery module configuration, current (near real-time) battery status information, current (near real-time) ambient conditions, and the like. When a charging profile has been selected, the controller 110 may process battery status information sensed by the sensor 150 to identify a current battery voltage, temperature and/or current value and may generate a control signal for communication to the generator 120. In applications having a generator 120 outputting two or more voltage level outputs, the controller 110 may monitor each voltage level circuit independently and generate a control signal to control recharge operation of the modules of each circuit. The control signal may cause the generator 120 to output electrical energy at a specified current level and/or at a specified voltage level based on the selected charging profile and the current battery conditions.

The controller 110 may monitor the battery voltage, battery current, the battery temperature, ambient temperature, and/or other parameters to determine whether a battery charged threshold has been met. If so, the controller 110 may output an indication that the battery module has been charged. If not, the controller 110 may identify whether a charging profile threshold has been met. For example, in some cases, a battery module 140 may be associated with one or more charging profiles, where each charging profile may correspond to a predetermined condition of the battery module. For example, for some battery modules, such as battery modules including a single battery type, different charging profiles may be defined for different battery temperatures or ranges of battery temperatures. In another example, for battery modules including mixed battery types, a charging profile may be defined based on different charging currents or ranges of charging currents. If a temperature or current threshold condition has been met, the controller 110 may select a different charging profile based on the current (e.g., near real-time) battery module parameters. If not, the controller 110 may continue the battery module recharge process using the same earlier selected charging profile. Once the controller 110 has indicated the battery module 140 has been recharged (e.g., battery parameter(s) have reached predetermined criteria), the controller 110 may continue monitoring of the battery parameters to identify when to initiate the next battery recharge process.

Figure 3A:
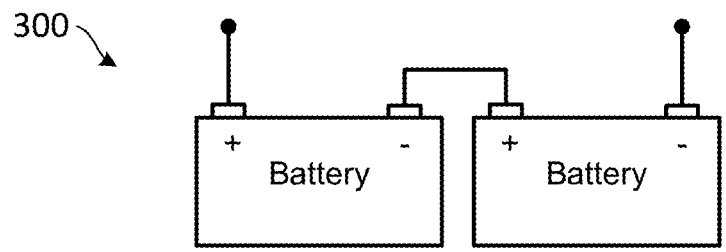
FIGS. 3A, 3B, and 3C show illustrative battery module configurations according to aspects of the disclosure.
Figure 3B:
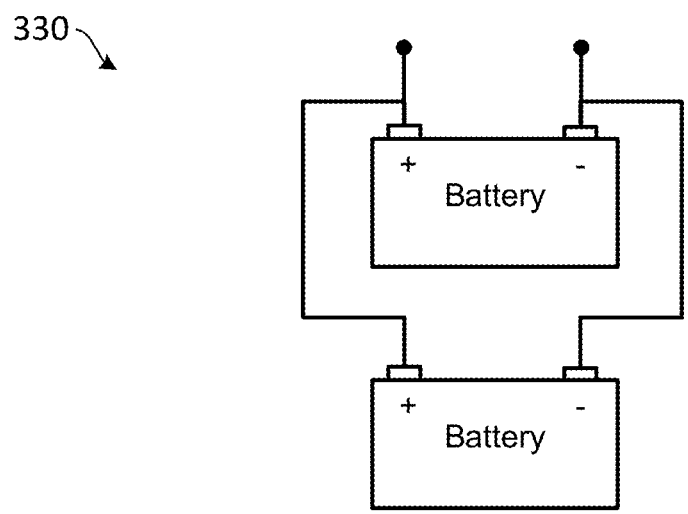
Figure 3C:
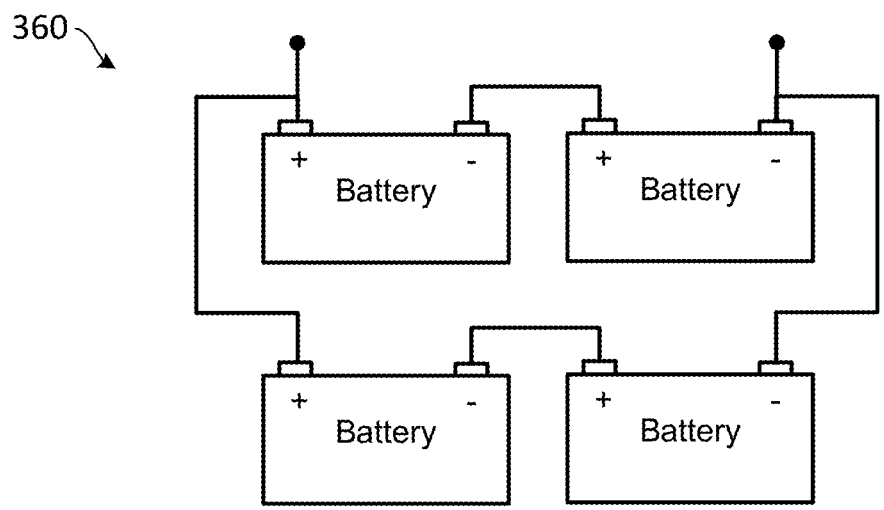

In some cases, the battery module 140 may include one or more batteries 142, 144 or battery cells. The batteries and/or battery cells included in the battery module 140 may be connected in one or more configurations. For example, FIGS. 3A, 3B, and 3C show illustrative battery module configurations according to aspects of the disclosure. FIG. 3A and FIG. 1 show an illustrative series connected battery module 300, 140. FIG. 3B shows an illustrative parallel connected battery module 330, and FIG. 3C shows an illustrative battery module 360 having both series connected and parallel connected batteries. While these figures show the battery modules including individual batteries, the battery modules may include one or more batteries, battery cells or combinations of batteries, where one or more batteries include multiple cells. The battery modules 140, 300, 330, and 360 may include one or more batteries of a single type such as lithium-ion batteries, nickel-cadmium batteries, and lead-acid batteries. In some cases, the battery modules 140, 300, 330, and 360 may include a combination of battery types.

The sensor 150 may be a single sensor (e.g., a "smart" sensor) capable of measuring one or more conditions corresponding to battery module operation and/or may be capable of logging battery module operation data over time. In some cases, the sensor 150 may comprise a number of discrete sensors each capable of measuring one or more battery conditions, such as individual voltage sensors, current sensors, temperature sensors and the like. The sensor 150 may be located adjacent the battery module 140, such as near a terminal (e.g., the second negative terminal 146). In some cases, the sensor may be operably coupled to a plurality of locations at or near the battery module 140, such as at different positive terminals 143, 145 and/or negative terminals 146, 148. The sensor 150 may be communicatively coupled to the controller 110 to communicate current and/or historical information corresponding to battery operation. The sensor 150 may also be configured to monitor one or more of a generator voltage, a generator current, a generator temperature, a ground current, and the like.

Figure 2:
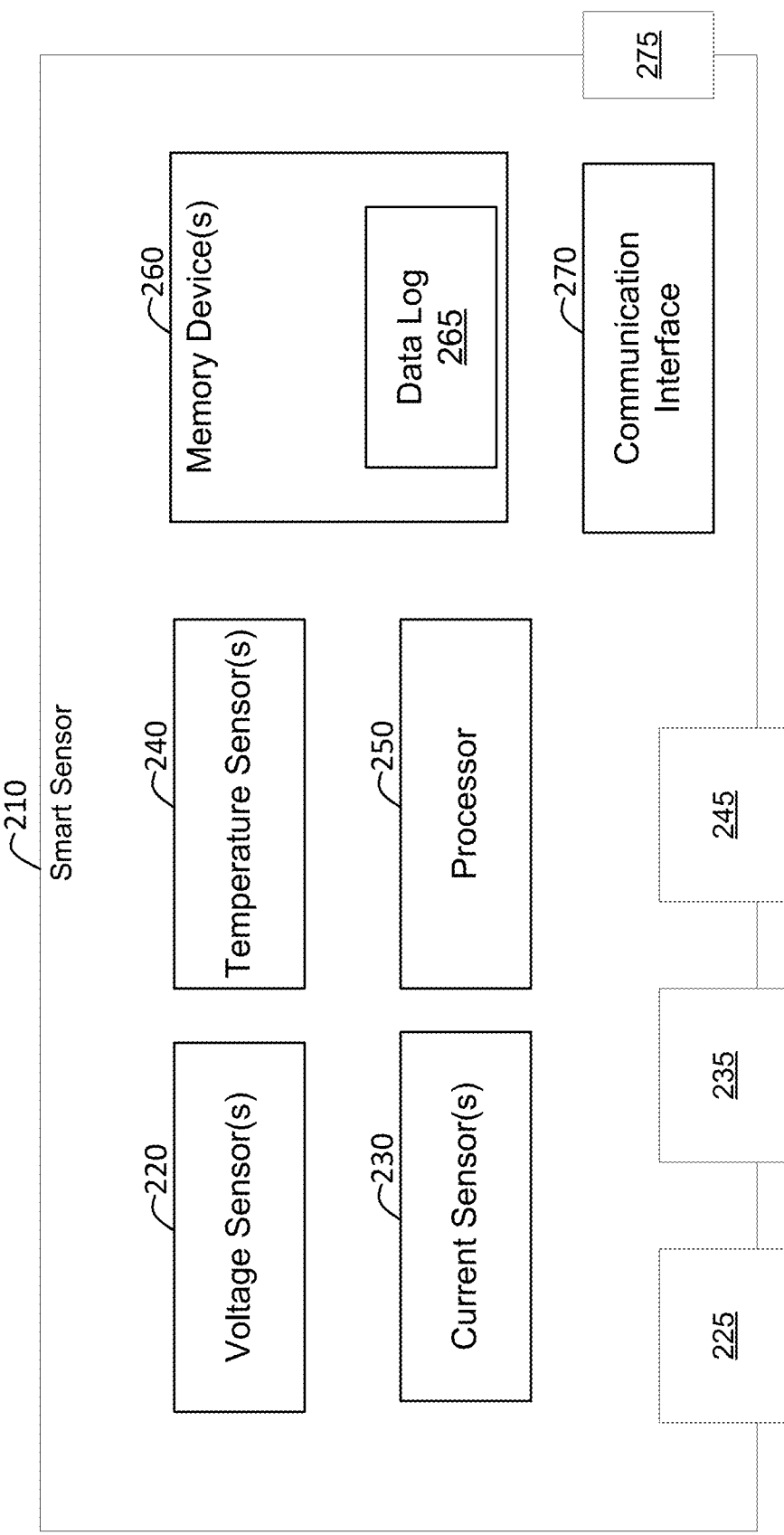
FIG. 2 shows an illustrative "smart" sensor that may be used in a battery charging control system according to aspects of the disclosure.

FIG. 2 shows an illustrative "smart" sensor 210 (e.g., the sensor 150) that may be used in a battery charging control system according to aspects of the disclosure. The smart sensor 210 may include one or more voltage sensors 220, one or more current sensors 230, one or more temperature sensors, a processor 2550, a memory device 260, and a communication interface 270. The smart sensor 210 may also include one or more ports for sensing and/or communication information, such as a voltage sense port 225, a current sense port 235, a temperature sense port 245 and/or a communication port 275. In some cases, the memory devices 260 may be used to store computer executable instructions to be executed by the processor 250 to process and/or log sensor information. The voltage sensors 220 may include one or more voltage sensors configured to sense a voltage at one or more locations within the generator-based battery charging system 100, such as at a battery terminal 143, 146, 145, and 148, at a generator terminal (e.g., B+, B−, etc.), or other such location. The current sensors 230 may include one or more current sensors configured to sense a current at one or more locations within the generator-based battery charging system 100, such as at a battery terminal 143, 146, 145, and 148, at a generator terminal (e.g., B+, B−, etc.), or other such location. The temperature sensors 240 may include one or more temperature sensors configured to sense a temperature at one or more locations within the generator-based battery charging system 100, such as at a battery location (e.g., internal to the battery module, at an exterior surface of a battery module, etc.) and/or to sense an ambient temperature corresponding to the location of the generator-based battery charging system 100.

In some cases, the voltage sensors 220 may comprise a voltage transducer, a resistor circuit, or other such voltage sensing technology. The current sensors 230 may comprise one or more of a hall-effect sensor, a transformer or clamp-based sensor, a resistor circuit or other such current sensing apparatus. The temperature sensors 240 may include one or more temperature sensing technologies, such as a thermistor, a thermocouple, a thermometer, or other such temperature sensing apparatus. The voltage sensors 220, current sensors 230, and/or the temperature sensors 240 may be physically located within a smart sensor housing or external to the smart sensor housing.

The processor 250 may be configured to receive sensor signals from one or more of the voltage sensors 220, current sensors 230, and/or the temperature sensors via the ports 225, 235, and 245. The processor 250 may be configured to store the sensor data in the memory devices 260, as raw data, as processed data or both. The processor 250 may be configured to sample the sensor data at a predetermined rate, at a near-real time rate, or upon different triggering conditions. The smart sensor may compile a data log 265 of battery module operational information and periodically communicate the data log to the controller 110 or to a user. The smart sensor 210 may communicate the data a predetermined intervals or in answer to a received request. The communication interface 170 may include one or more serial communication interfaces, parallel communication interfaces, network communication interfaces and/or analog communication interfaces. For example, the smart sensor may be configured to communication analog sensor information to the controller 110 via one or more analog communication ports corresponding to one or more of a current signal, a voltage signal, and/or a temperature signal. In some cases, the processor may process sensor information to calculate a state of charge of the battery module, a depth of charge of the battery module, or other such calculation. In some cases, the controller 110 may send a command to the smart sensor to sense current, voltage and/or temperature information from the battery module. In some cases, the controller 110 may communicate a sampling frequency at which the current, voltage and/or temperature signals may be sampled and/or communicated to the controller.

In some cases, the smart sensor 210 may be configured to be attached to a negative terminal 146, 148 of the battery 142, 144 within the battery module 140. The smart sensor may be configured to monitor the charging and discharging current, voltage, and/or temperature of the battery via the voltage sensors 220, the current sensors 230, and the temperature sensors 240. The smart sensor may be configured to monitor these parameters with a high level of precision (e.g., ±0.01, etc.). In doing so, the smart sensor provides battery information to allow for proactive power management of a plurality of electrical devices associated with a vehicle or other application (e.g., portable electronic devices, industrial applications, transportation applications, residential applications, and the like). By using the smart sensor, many advantages may be realized, such as efficiently managing electrical use and the cost associated with that use, reducing vehicle mileage in vehicular applications, and reducing $CO_2$ emissions in fossil fuel applications. Based on the sensed parameters, the smart sensor may be configured to calculate a SOC of the battery module, or a component of the battery module.

Additionally, the smart sensor 210 may be configured to provide a number of diagnostic features, such as during production and operation of the generator-based battery charging system 100. For example, the smart sensor 210 may be configured to log and/or report diagnostic trouble codes, record historical battery information and/or may be programmed to perform certain warranty operations (e.g., a firmware upgrade). In some cases, the smart sensor 210 may be configured to store information about the battery including the age of each battery, battery cell or battery module, an associated manufacturer of the battery, battery cell or battery module, a battery type or types of each component of the battery module, and the like. In some cases, the battery module 140 may include a memory device storing battery information such as the age of each battery, battery cell or battery module, an associated manufacturer of the battery, battery cell or battery module, a battery type or types of each component of the battery module, and the like. In such cases, the smart sensor 210 may be capable of uploading battery information from the battery module 140. In some cases, the smart sensor 210 may be used to reduce vehicle breakdowns, or other electrical device downtime, due to weak batteries—which may be up to 50% of reported downtime. The smart sensor 210 may be configured to operate with a plurality of battery types and/or voltage levels, where a single device may be integrated into an existing control system using a standardized communication protocol (e.g., CANBus J1939), or a customizable communication protocol.

In some cases, the smart sensor may be configured to operate within a temperature range of between −40° C. and +105° C. The smart sensor may be configured to operate within a specified voltage range (e.g., about 0 V to about 40 V, about 12 volt to about 80V, and the like). In an illustrative vehicle based example, the smart sensor 210 may be configured to measure a battery voltage (e.g., 14V to about 28V, from about 0V to about 40 V with a specified precision (e.g., ±0.01, ±0.1, etc.). The current sensors may be configured to measure current within a specified range (e.g., from about 0.2 A to about 1000 A, etc.) with a specified precision (e.g., about ±1%, ±0.5%, etc.). The temperature sensors may be configured to measure temperatures within a specified range (−40° C. and +105° C.) with a specified precision (e.g. about ±0.1° C., etc.). In some cases, the processor 250 may be configured to process an algorithm for measuring and/or conditioning a battery voltage so that the generator voltage regulator or controller 110 may be able to use this information for real-time compensation of voltage drop across cables to the battery.

In some cases, the smart sensor may be configured to perform data collection, such as on current consumption, in sleep mode for continued monitoring capability during inactive periods. The data log 265 may be capable of storing large amount of data over a period of time (e.g., about 40 hours, about 65 hours, about 100 hours, etc.). Further, the smart sensor may be capable of generating histograms representative of all parameters with up to 1 million hours being a theoretical limit. The smart sensor 210 may include a status LED showing a status of the smart sensor, a component of the smart sensor (e.g., a sensor status), and/or a battery module charge status. For example, a charged battery status may be indicated by a first color (e.g., green), a charging status may be indicated by a second color (e.g., yellow), and a discharged status threshold level may be indicated by a third color (e.g., red). In some cases, the smart sensor may include one or more other status indicators, such as a textual indicator, a graphical indicator, an audio indicator, and the like.

In some cases, specialized algorithms may be implemented to monitor and/or manage battery energy usage and/or charging via customizable algorithms. For example, in a vehicular application the smart sensor may assist engine start/stop idling functionality by monitoring battery SOC and adjusting the charging algorithms accordingly.

Figures 4A, 4B:
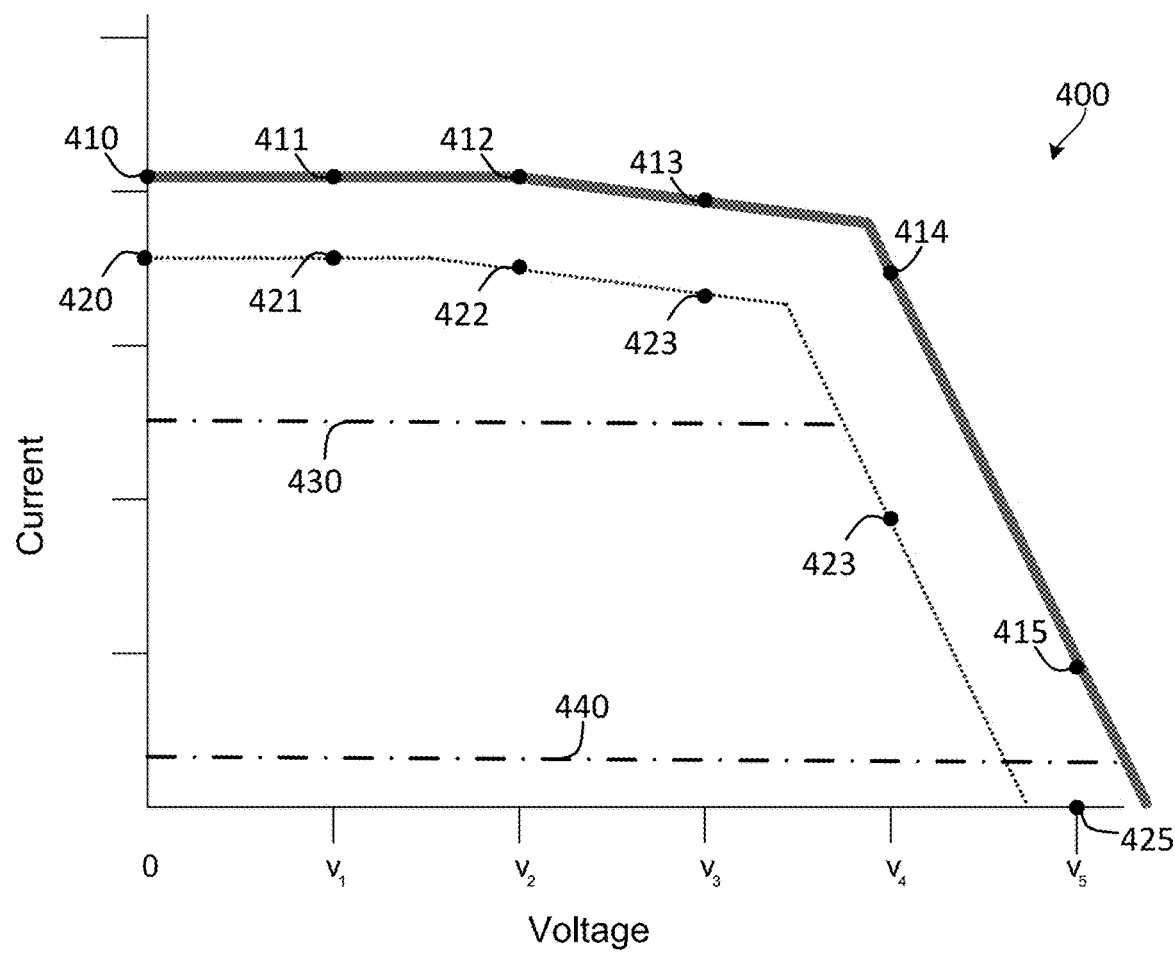
FIGS. 4A and 4B show an illustrative representation of a charging profile according to aspects of the disclosure.
Figure 4C:
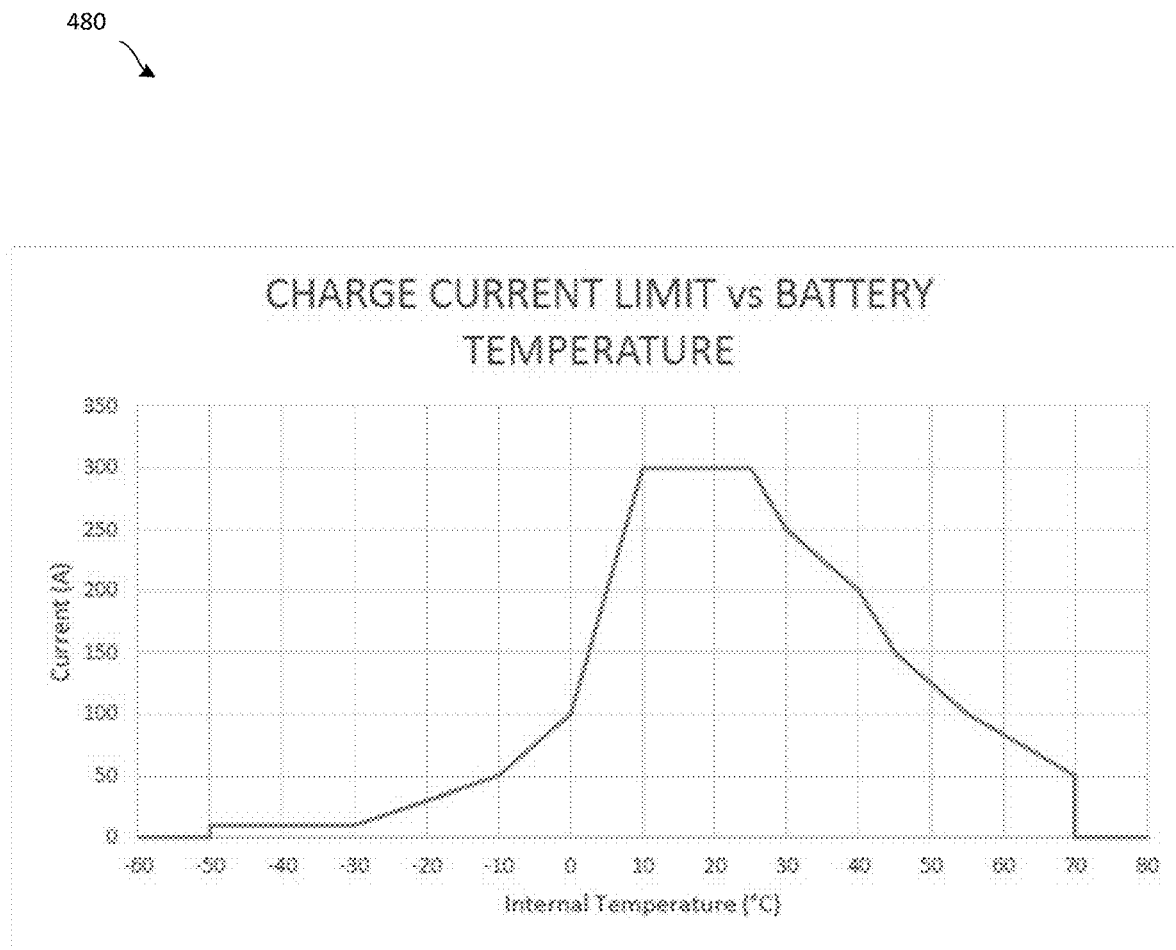
FIG. 4C shows an illustrative chart showing maximum charging current vs. temperature for an illustrative Li-Ion battery.

FIGS. 4A and 4B show an illustrative representation 400, 450 of a charging profile according to aspects of the disclosure and FIG. 4C shows an illustrative chart showing maximum charging current vs. temperature for an illustrative Li-Ion battery. In some cases, the charging profile may be illustrated in a graphical format, such as in a chart 400 and a chart 480. The charging profile 400 may be individually generated for each battery module, by type of battery (e.g., Li-ion, Ni metal hydride, lead acid, etc.), module configuration, number of batteries, number of battery cells, manufacturer specific characteristics, and the like. In the illustrative example, 400, a Li-ion charging profile is illustrated, showing a current command value along the y-axis and a battery voltage level along the x-axis. In the illustrative example 480, a Li-ion charging profile is illustrated, showing a current command value along the y-axis and an internal battery temperature level along the x-axis. Unlike traditional battery charging schemes or profiles, the current command value is not necessarily constant over a time or voltage range. Rather, the current command may vary in near real-time based on the real-time measured voltage at the battery. In some cases, the charging profile may include a maximum current profile 410 or a maximum current profile 410 and a minimum current profile 420. The maximum current profile may be determined based on manufacturer provided information, measured values and/or interpolated results. In some cases, the command current may be allowed to be anywhere within the maximum current profile 410 and the minimum current profile 420. In some cases, the maximum and minimum current profiles may mirror each other. In other cases, the minimum current profile 420, 440 may be different than the maximum current profile 410.

In some cases, the charging profile 400 may be represented in a tabular format, such as in charging profile 450. For example, a command current value (e.g., $I_1$, $I_2$, $I_3$, etc.) may correspond to a measured voltage value (e.g., $V_1$, $V_2$, $V_3$, etc.). In some cases, the controller may interpolate between points. In other cases, the current command value may remain constant or increase/decrease at a defined rate (e.g., slope). In some cases, the charging profile may be represented as an algorithm as a function of voltage and/or temperature.

Figure 5:
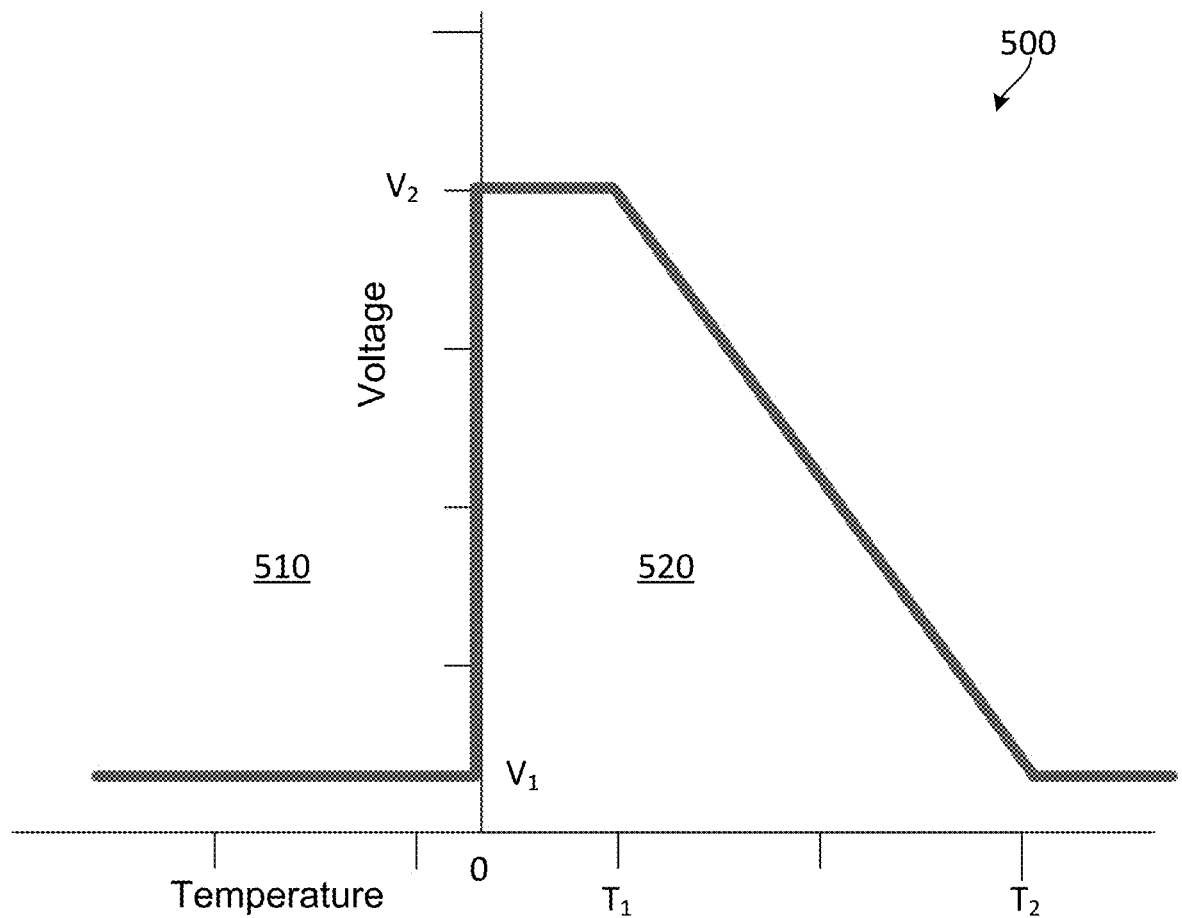
FIG. 5 shows an illustrative charging profile for a mixed-type battery module according to aspects of the disclosure.

FIG. 5 shows an illustrative charging profile 500 for a mixed-type battery module according to aspects of the disclosure. In some cases, a battery module 140 may include a plurality of battery types, such as a battery module having both Li-ion batteries and lead acid batteries, or another combination of battery types. In such cases, the battery characteristics may differ based on the individual characteristic of the used battery types. To allow for safe and efficient charging of such mixed-type battery modules, a charging voltage limit may be set based on a sensed temperature (e.g., a real time temperature signal). In the illustrative example, the charging profile 500 may include two or more charging profile sections 510 and 520. For example, section 510 may correspond to a first voltage $V_1$ command at temperature readings of less than or equal to a first temperature threshold (e.g., 0° C.), a second voltage command $V_2$ over a second temperature range from 0 to T1, a third ramped voltage command over a third temperature range T1 to T2, and a fourth voltage command ($V_1$) over a fourth temperature range equal to or greater than T2. In some cases, the command voltage profile 500 may be interpolated as a function of temperature between two or more specified command voltage and temperature pairs.

Figure 6:
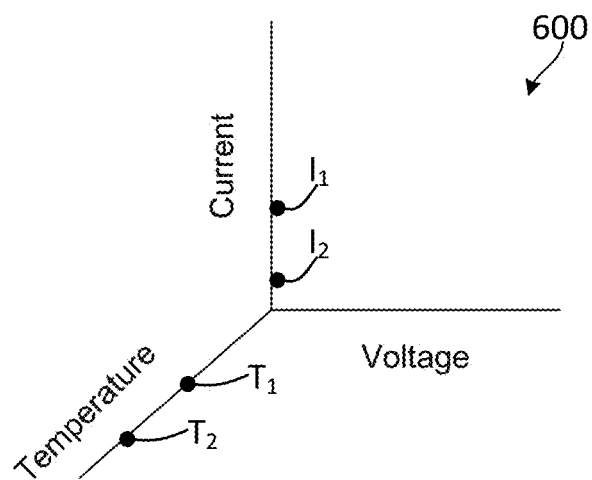
FIG. 6 shows illustrative representation of a charging profile variable system according to aspects of the disclosure.

FIG. 6 shows illustrative representation of a charging profile variable system 600 according to aspects of the disclosure. In many cases, two or more charging profiles may be identified for a particular battery module. For example, a first charging profile (e.g., charging profile 400) may be defined for use at a specified nominal temperature (e.g., 30° C.) or within a nominal temperature range. In some cases, the nominal temperature or nominal temperature range may correspond to a nominal operating temperature as specified by a battery manufacturer. In some cases, battery operation, discharging characteristics and/or charging characteristics can change based on certain operating conditions. For example, for a Li-ion battery, the charging characteristics may change dependent upon a temperature of the battery. Similarly, for mixed battery type battery modules, the charging characteristics may change based on current flow through the battery during charging. For example, a specified voltage command may cause one battery type to heat more than a second battery type.

In such cases, the selected charging profile may be dependent on temperature, current and voltage. As can be seen, a charging profile may be generated within a three-dimensional space (or three dimensional table or data structure) such that changing conditions may be accounted for during charging operations. For example, a charging profile may be generated as a three dimensional surface to allow the controller 110 to command the generator to output a specified voltage and a specified current based on a particular sensed temperature. In mixed battery operations the real-time sensed charging current may cause the controller 110 to switch charging profiles based on expected heating or measured heating of different battery components in the battery module. For example, a Li-ion battery module may be charged using a first profile (e.g., a current vs voltage charging profile such as charging profile 400) when the temperature is within a range near Temperature $T_1$. The controller 110 may switch to a second charging profile when the temperature comes within a second temperature range near $T_2$. Similarly, for mixed battery modules using a voltage vs temperature profile such as profile 500, the controller may be configured to use a third charging profile when the charging current is within a range near a first current I1 and a second charging profile when the charging current is within a range near a second current I2. In some cases, the charging profile and/or the threshold conditions for switching between different charging profiles may be dependent on a battery type installed as part of the battery module 140.

Figure 7:
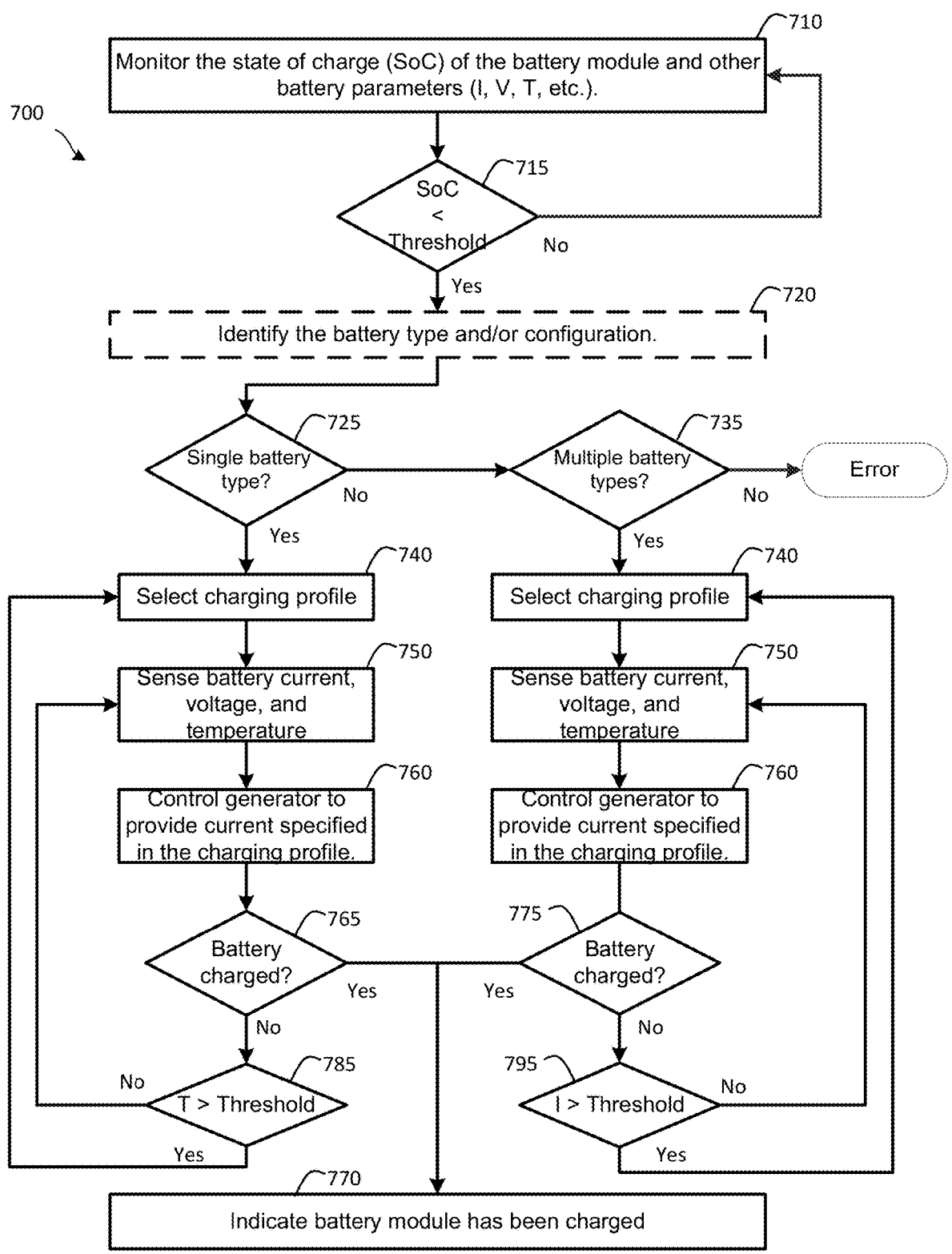
FIG. 7 shows an illustrative method of battery charging using a charging profile according to aspects of the disclosure.

FIG. 7 shows an illustrative method 700 of battery charging using a charging profile according to aspects of the disclosure. For example, at 710, the controller 110 may be configured to monitor a state of charge of the battery module 140, along with other battery module parameters (e.g., current, voltage, temperature, etc.) during operation, such as when the generator is operating and/or the electrical load 130 is drawing electrical energy from the battery module 140. In some cases, the controller may receive one or more of the monitored values in near real-time from the sensor 150. At 715, periodically or continuously, the controller may determine whether the SOC has met a predefined threshold condition. If not, the controller continues to monitor the battery module parameters at 710. If so, the controller 110 may identify a battery type and/or battery module type used within the battery module 140 at 720. In some cases, the controller 110 may be pre-configured with the battery type information and retrieve the information from the memory 160. In other cases, the controller 110 may obtain the battery type information from a memory device stored on the sensor 150 and/or a memory device installed as part of the battery module. In some cases, the battery type information may include a number of batteries and/or cells installed as part of the battery module 140, a type of each battery or cell installed in the battery module, a configuration type of the battery module (e.g., series connection, parallel connection, a mixed series and parallel connection.

At 725, the controller 110 may determine whether a single battery type has been used. If so, the controller 110, at 740, may select a first charging profile (e.g., current profile 400 for an illustrative Li-ion battery module) based on the identified battery type, the identified module configuration, and one or more battery parameters (e.g., a real-time current value, a real-time voltage, a real-time temperature, etc.). If not, at 735 the controller 110 may determine whether multiple battery types are installed. If so, at 740 at charging profile may be selected by the controller (e.g., the charging profile 500) corresponding to the identified battery types, the configuration of the battery module, and one or more battery parameters (e.g., a real-time current value, a real-time voltage, a real-time temperature, etc.). If the battery module configuration cannot be identified, the controller may issue an error and/or may follow a predefined charging profile, such as a multiple battery type charging profile.

At 750, the controller 110, along with the sensor 150, may monitor the battery current, voltage and temperature in real-time, near real-time, or by sampling at predetermined intervals. At 760, based on the sensed current, voltage and/or temperature, the controller issues a command to the generator 120 to either output a commanded current and/or a commanded voltage based on the selected profile. At 765 or 775, the controller 110 may determine based on the sensed battery parameters, an indication of whether the battery module has been charged (e.g., met a charging criteria such as a predefined SOC, voltage and/or current level). If so, the controller 110 will end the charging procedure at 770 and/or output an indication that the battery module 140 has been charged. If not, the controller 110 may identify whether a charging criterion (e.g., a temperature threshold at 785, a current threshold at 795, etc.) has been reached. If not, the controller 110 continues to sense the battery parameters at 750. If so, the controller 110 may be configured to determine whether to use a different charging profile at 740, based on the sensed battery parameters and/or the battery module type or configuration.

Figure 8:
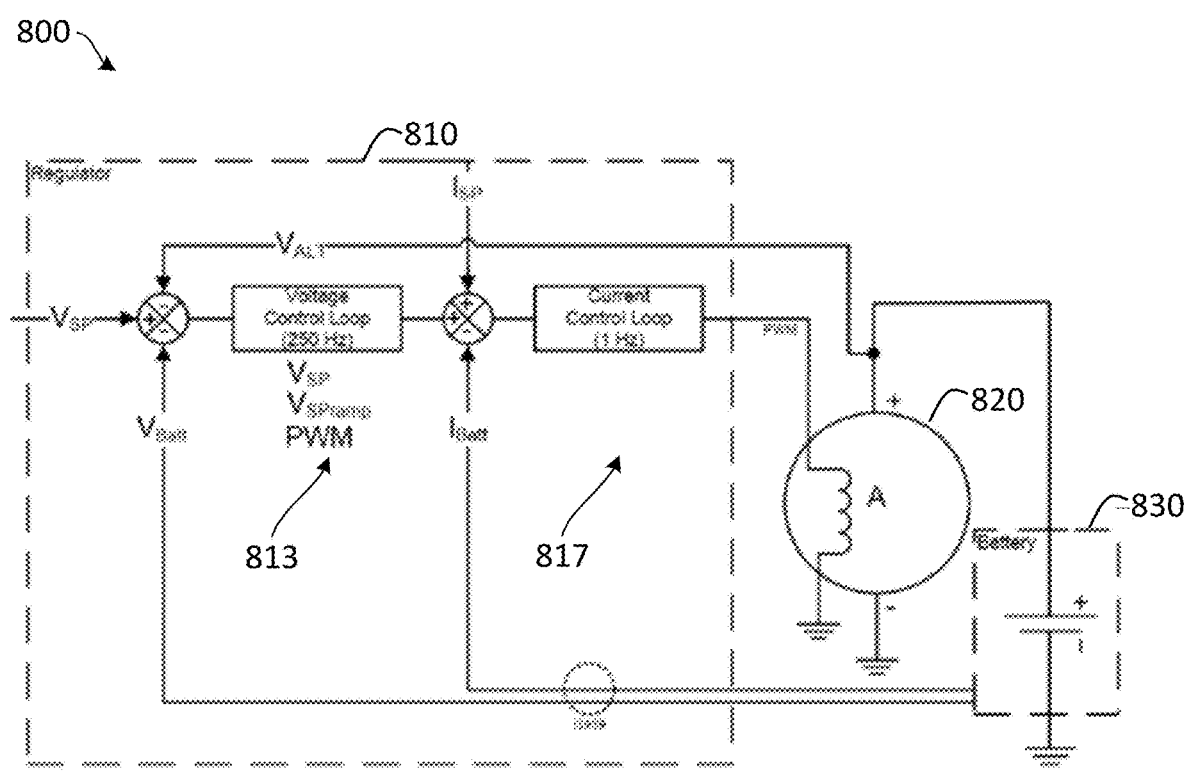
FIG. 8 shows an illustrative block diagram representation of a control strategy utilizing a dual control loop according to aspects of the disclosure.

FIG. 8 shows an illustrative block diagram representation of a control strategy utilizing a dual control loop according to aspects of the disclosure. A generator control system 800 (e.g., a vehicle electrical system) may include a regulator 810, a generator (e.g., an alternator 820) and a battery 830. The regulator 810 may implement a control strategy for controlling an output of the alternator 820 to charge a battery including one or more control loops, such as the shown dual control loop strategy. For example, the illustrative regulator 810 may implement a first control loop 813 as a voltage control loop and a second control loop 817 as a current control loop.

In this illustrative example, the primary control loop is the voltage control loop 813 that is implemented by the regulator 810 as the main control loop for the alternator. As such, the regulator controls the output voltage of the alternator 820 using the voltage control loop 813. This control loop may be run at a defined frequency that may be running at higher speed than the current control loop 817. In this illustrative example, the voltage control loop may run may be processed once every 0.004 sec or at 250 Hz and may control the alternator output voltage ($V_{alt}$) to be equal to the alternator set point ($V_{sp}$). A battery voltage ($V_{batt}$) parameter may be used, for example, in a calculation of a voltage drop across the cables between the alternator and the battery. The regulator 810 may be programmed compensate for this voltage drop in the voltage control loop 813 to ensure that a voltage at the battery terminals follows a defined curve, rather than the voltage at the alternator terminals.

Additionally, the regulator 810 may process a second control loop, the current control loop 817, to control a maximum battery charging current. This current control loop 817 may be run at a same frequency or at a different frequency than the voltage control loop 813. In the illustrative example, the current control loop may run at a slower frequency (e.g., once every second or at 1 Hz). In some cases, the current control loop may be processed at a frequency faster than the voltage control loop. The regulator 810 may receive sensor information corresponding to one or more battery conditions, including the battery charging current, and may compare the sensed current to the predefined limits based on current battery conditions (e.g., internal battery temperature, ambient battery temperature, SOC, SOH, etc.). If the sensed current exceeds the limit, the regulator 810 may use the second control loop 817 to restrict the field excitation current of the alternator to bring the battery charging current back within the specified limits. Additionally, if the charging current is sensed to drop below a minimum current limit, the second control loop 817 releases any active current to increase the battery charging current. In some cases, the regulator 810 may process the second control loop 817 to command the charging current at or near the maximum charging current to ensure the battery 830 is charged as fast as possible.

While, in the illustrative example, the first control loop 813 (e.g., the voltage control loop) may be operating faster (e.g., about 25 Hz, 100 Hz, 250 Hz, 500 Hz, etc.) than a second control loop 817 (e.g., the current control loop) timing (e.g., at about 0.5 Hz, 1 Hz, 5 Hz, 10 Hz, 25 Hz, etc.), other timings may be used. For example, in a particular installation, the first control loop 813 and the second control loop 817 may operate at a same frequency. Further, in some cases, the second control loop 817 may operate at a faster rate than the first control loop 813. Such configurations may be dependent upon different system stability characteristics of a particular battery charging system, battery module characteristics, battery charging characteristics, battery aging characteristics, and/or other considerations or conditions. In some cases, the operational timings of one or both of the first control loop 813 and the second control loop 817 may change over time based (e.g., as a function of one or more system or battery parameters), such as on a number of batteries or battery modules being charged, an age of one or more batteries, a SOC or SOH characteristic of one or more batteries being charged, a temperature of one or more batteries, and the like.

In some cases, the regulator 810 may adjust an alternator set point to be in a range higher than the battery OCV but lower than the value at which the battery can reach 100% SOC. In this example, the regulator 810 may sense an initial battery voltage (e.g., about 26.0 Volts) before the alternator is started. The regulator 810 may add a voltage offset (e.g., about 0.2 Volts) to the initial battery voltage and may store the combined value as an alternator starting set point voltage, about 26.2 Volts in this example. In some cases, the regulator 810 may identify an alternator end set point that may be chosen to limit the voltage under a predefined maximum voltage. This maximum voltage may be a value (e.g., about 29.0 Volts) that may prevent the voltage from reaching a 100% SOC for a particular battery or battery module. The regulator 810 may control the set point from an initial starting set point to the end set point over a predetermined period of time (e.g., about 14 seconds). As such, the regulator 810 may control the alternator set point to increase from the starting set point to the end set point at a defined rate. In the illustrative example, the regulator may determine the voltage set point ramping rate using the equation $(SP_{end}-SP_{start})/(T_{period})$, resulting in a ramping rate of 0.2 Volts/second.

During this time, the regulator 810 may use the second control loop 817 to monitor the battery charging current to ensure the charging current remains within predefined maximum and minimum charging limits. In some cases, the charging limits may be constant values. In some cases, the charging limits may be determined based on an equation, charging profiles and/or battery parameters. In some cases, the regulator 810 may adjust the alternator field excitation limit to make sure the charging current stays within the predetermined minimum charging current value and the maximum charging current value (e.g., within 90% to 100% of an absolute value of the maximum charging current at current battery conditions). By using the dual control loops, the voltage control loop 813 and the current control loop 817, the regulator 810 may charge the battery 830 to a desired voltage level, while controlling the battery charging current without changing the voltage set point after an initial ramp up period. The voltage set point may remain constant and/or equal to a predetermined maximum set point to avoid reaching the 100% SOC value, while eliminating a risk that the voltage set point may be set below the battery OCV.

The regulator 810 may include a memory device for storing one or more system parameters. In some cases, the parameters may be configurable to adjust the control algorithms to specific applications based on alternator specifications, battery types used, a number of batteries installed, a number of battery modules installed, a number of batteries in each battery module, and the like. In some cases, a battery charging profile for a maximum current value may be stored in the regulator's memory as a table. In some cases, a current profile may be communicated, as either a digital signal or an analog signal, to the regulator from an external computing device. For example, the current profile may be communicated from an external storage device, a smart sensor, a battery module, a battery, or the like. Additionally, other parameters, such as temperature values, SOC values, SOH values or the like, may be communicated similarly. In some cases, multiple batteries may be connected in parallel such that the regulator 810 receives sensor information from each of the batteries. The regulator 810 may optimize the algorithm based on the sensor information to provide safe charging for all connected batteries. For example, the regulator 810 may determine a highest battery temperature value of the connected batteries and calculate voltage and current set points to enable charge regulation to ensure all connected batteries operate in a safe operating region.

When one or more batteries disconnect from the system 800, the regulator 810 may identify the disconnected status and may automatically adapt the regulation for any remaining connected batteries. In some cases, an override command input may be received by the regulator 810 via an input, not shown. The override command may be used to change one or more operating parameters of the regulator based on an operating condition of the vehicle, such as a battery state of health parameter, a state of charge parameter, a current parameter, a voltage parameter, and the like. For example, in vehicles with multiple batteries, one or more large alternators may be used to provide electrical energy to the vehicle and charge the batteries. Under certain vehicle operating conditions, the alternator may use a large portion of the available engine torque. As a result, the vehicle may not have enough available torque to allow for desired movement. In such cases, a vehicle component (e.g., an engine control unit, etc.) may send an override command to the regulator 810 to command a lower maximum charging current value, so that extra power may be available to the vehicle engine to allow proper vehicle movement. In some cases, a second override command may be received from an external device at the regulator 810. This second override command may be used to initiate limiting of a maximum SOC value for one or more batteries. Such SOC limitations may be used to allow for safe battery transportation and/or storage.

In some cases, the regulator may receive a command to disconnect and/or connect one or more batteries or battery modules from the system. For example, a vehicle may include one or more battery packs (e.g., battery modules) that may each include one or more batteries. In some cases, a vehicle may use a battery pack for starting a vehicle and a different battery module during normal operation. The regulator may receive a command to connect or disconnect a battery module, either before or after the battery module has been charged. In some cases, the regulator 810 may receive an input to disconnect a battery module immediately. In some cases, the regulator may receive an input to disconnect a battery module dependent upon the battery module reaching a predefined voltage set point.

Additional inputs received by the regulator 810 may be received from a battery and/or a smart sensor. For example, a battery may include a processor that may be used to calculate an open circuit value for the battery. This value may be communicated to the regulator 810 for use in adjusting operation of the first control loop 813 and/or the second control loop 817. Additionally, one or more of the battery parameters may be measured by a smart sensor and communicated to the regulator 810. Illustrative parameters sensed by the smart sensor may include one or more of a battery voltage, a battery current, a batter temperature, an SOC value, an SOH value, and/or the like.

Figure 9:
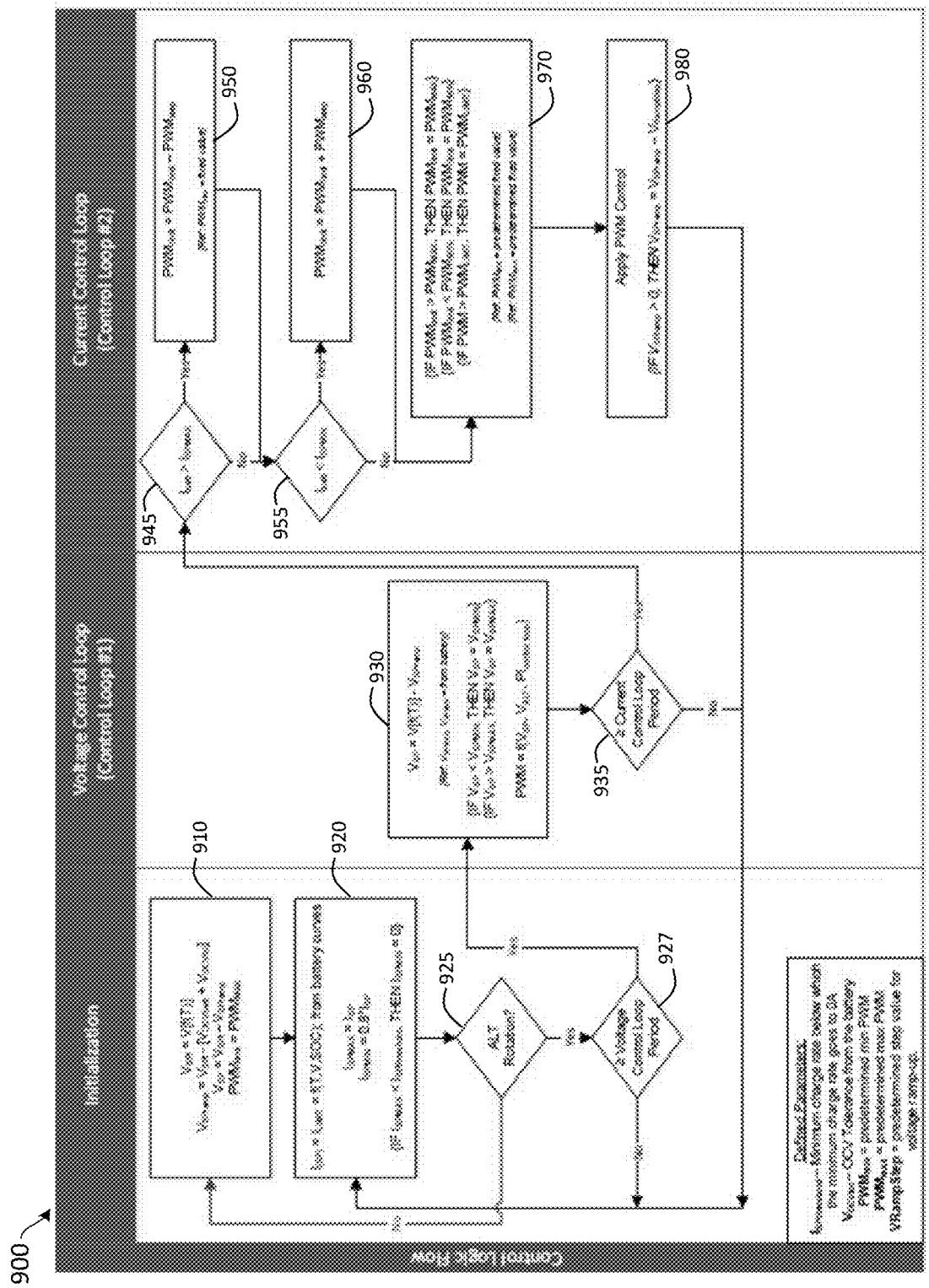
FIG. 9 shows an illustrative method of battery charging using a dual control loop algorithm according to aspects of the disclosure.

FIG. 9 shows an illustrative method 900 of battery charging using a dual control loop algorithm according to aspects of the disclosure. At 910 and 920, the regulator 810 may perform an initialization routine to calculate one or more initialization parameters. In the illustrative example, at 910, the regulator 810 may calculate initial voltage set point parameters and/or a pulse width modulation (PWM) frequency value, a duty cycle value, or both. At 920, the regulator 810 may calculate one or more current set point parameters. For example, the regulator 810 may calculate voltage and/or current parameters based on system characteristics, battery characteristics, or both. In some cases, the regulator 810 may identify one or more current and/or voltage parameters based on one or more battery charging profile curves. At 925, the regulator 810 may determine whether the alternator 820 is rotating. If not, the regulator 810 may return to 910 to continue or complete calculation of the initialization parameters. If the alternator has been determined to be rotating at 925, then the regulator may determine whether the voltage control loop 813 period has expired. If not, the regulator may return to step 920 to calculate one or more current loop parameters. If the voltage control loop period has expired at 927, then the regulator may process algorithms of the voltage control loop 813, determine a PWM command value based on the voltage control loop parameters, and control the battery charging based on the PWM calculations.

At 935, the regulator 810 may determine whether the current control loop period has expired. If not, the regulator may return to 920 to calculate current control loop parameters. If so, at 945, the regulator may determine whether the battery charging current is greater or equal to the maximum charging current value. If the battery current is less than the maximum charging current, the regulator 810 may check whether the command charging current is less than a minimum charging current at 955. If, at 954, the charging current is greater than the maximum charging current set point, the regulator 810 may adjust the PWM control such as reducing the PWM command value by a first predetermined value at 950 and then determine whether the command charging current is less than a minimum charging current at 955. If, at 955, the charging current is less than the minimum value, the regulator 810 may increase the PWM command value by a second predetermined value at 960. In some cases, the first predetermined step value is different than the second predetermined step value. In some cases, the first predetermined step value is the same as the second predetermined step value. At 960, the regulator 810 may compare the PWM command value to maximum and/or minimum PWM command parameters and may adjust the PWM command value as necessary. At 980, the regulator applies the PWM command value to control charging of the battery and the regulator returns to step 920.

Figure 10:
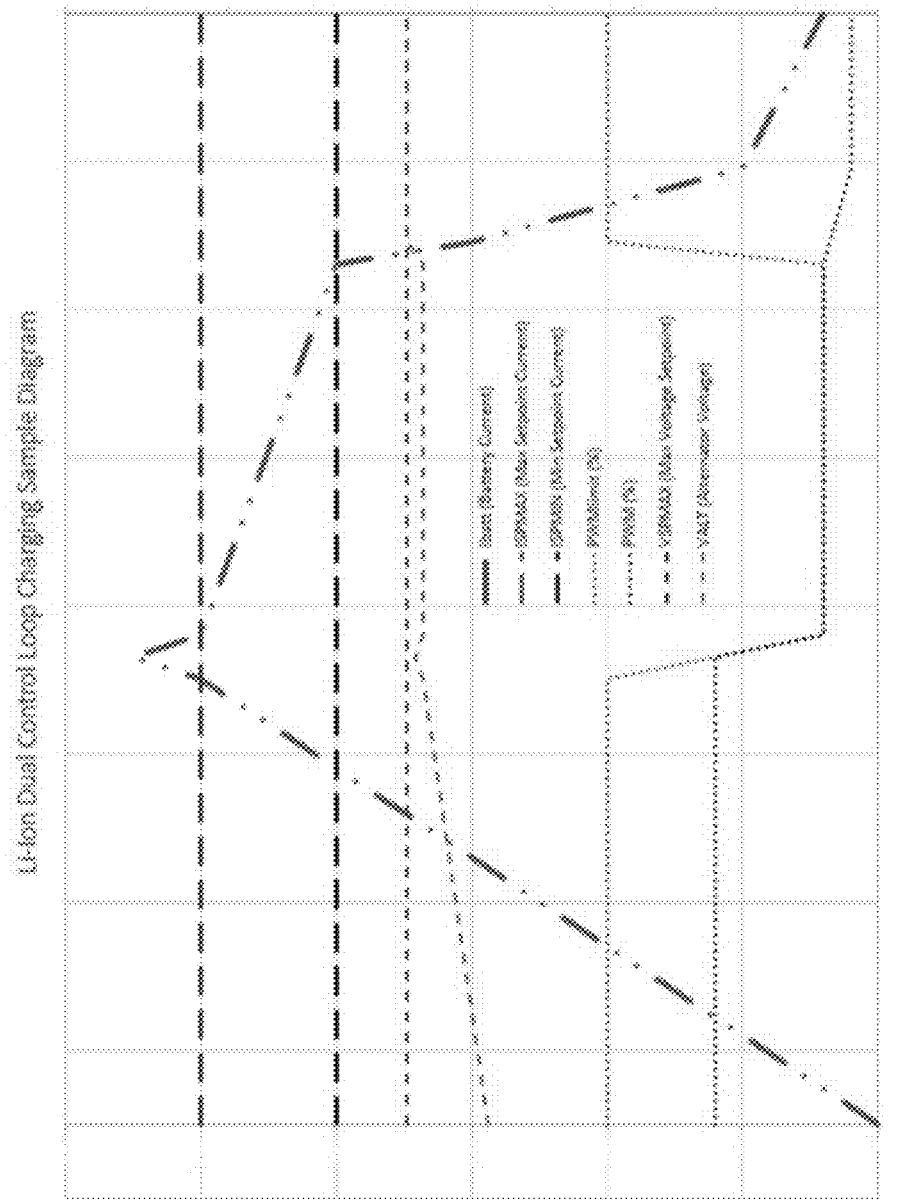
FIG. 10 shows an illustrative chart depicting charging parameters over time according to aspects of this disclosure.

FIG. 10 shows an illustrative chart depicting charging parameters over time according to aspects of this disclosure. For example, FIG. 10 shows an illustrative plot of battery current and alternator voltage with respect to different parameter set points over time.

While this disclosure describes in detail in terms of specific examples including presently preferred modes of carrying out the invention, those skilled in the art will appreciate that there are numerous variations and permutations of the above described systems and methods. Thus, the spirit and scope of the invention should be construed broadly as set forth in the appended claims.

What is claimed is:

1. A system for generator-based charging of a battery module, the system comprising:
the battery module a sensor located adjacent the battery module a generator controller comprising a processor and a non-transitory memory device storing instructions that, when executed by the processor, cause the generator controller to:
analyze one or more sensor signals received from the sensor, the sensor signals corresponding to a condition of the battery module;
calculate, based on the one or more sensor signals, a generator current value for use in charging the battery module;
calculate, based on the one or more sensor signals, a generator voltage value for use in charging the battery module; and
generate a control signal comprising a command to control a generator field excitation current to provide the current value based on a current control loop and a voltage control loop, wherein the voltage control loop operates faster than the current control loop.

2. The system of claim 1, wherein the sensor comprises a number of sensors for sensing a plurality of battery conditions and a processor capable of determining a state of charge of the battery module based on the plurality of battery conditions.

3. The system of claim 1, further comprising a non-transitory memory device storing a plurality of charging profiles associated with one or more different battery module configurations.

4. The system of claim 1, wherein the battery module comprises a Li-ion battery.

5. The system of claim 1, wherein the voltage control loop is processed at a first frequency and the current control loop is processed at a second frequency and wherein the first frequency is greater than the second frequency.

6. The system of claim 1, wherein the current value is associated with a plurality of battery parameters sensed in near real time.

7. The system of claim 1, wherein operational timings of one or both of the voltage control loop and the current control loop change over time based as a function of one or more system or battery parameters.

8. A method for generator-based charging of a battery module, the method comprising:
analyzing one or more sensor signals received from the sensor, the sensor signals corresponding to a condition of the battery module;
calculating, based on the one or more sensor signals, a generator current value for use in charging the battery module, wherein the generator current value is determined based on a charging profile;
calculating, based on the one or more sensor signals, a generator voltage value for use in charging the battery module; and
generating a control signal comprising a command to control a generator field excitation current to provide the current value based on a current control loop and a voltage control loop, wherein the current control loop operates at a slower frequency than the voltage control loop.

9. The method of claim 8, comprising:
identifying, by the controller, a configuration of the battery module; and
identifying, by the controller, a charging profile for use in charging the battery module based on the configuration of the battery module and the sensor signals received from the sensor.

10. The method of claim 8, comprising:
retrieving, from the battery module, the charging profile for use in charging the battery module based on a configuration of the battery module and the sensor signals received from the sensor.

11. The method of claim 8, wherein a configuration of the battery module comprises a single battery type and the command signal corresponds to a current command to provide a specified output current based on a sensed voltage.

12. The method of claim 8, wherein a configuration of the battery module comprises a single battery type and the command signal corresponds to a command to output a specified output current based on a sensed voltage and a sensed temperature.

13. The method of claim 8, wherein the configuration of the battery module comprises a plurality of batteries and the command signal corresponds to a condition of a particular battery of the plurality of batteries.

14. The method of claim 8, wherein the voltage control loop is processed at a first frequency and the current control loop is processed at a second frequency.

15. A controller for a generator to charge a battery module, the controller comprising:
a processor; and
a non-transitory memory device storing instructions that, when executed by the processor, cause the controller to:
analyze one or more sensor signals received from the sensor, the sensor signals corresponding to a condition of the battery module;
calculate, based on the one or more sensor signals, a generator current value for use in charging the battery module, wherein the generator current value is limited based on a first charging profile;
calculate, based on the one or more sensor signals, a generator voltage value for use in charging the battery module; and
generate a control signal comprising a command to control a generator field excitation current to provide the current value based on a current control loop and a voltage control loop, wherein the voltage control loop operates faster than the current control loop.

16. The controller of claim 15, wherein the instructions, when executed by the processor, cause the controller to:
sense, in near real time, a plurality of battery module parameters including battery module current, battery module voltage, and battery module temperature; and
identify, based on a sensed plurality of battery module parameters whether a threshold condition has been reached; and
if so, select, based on the sensed plurality of battery module parameters, a second charging profile; and
identify, based on the sensed plurality of battery module parameters, a second generator output using on the second charging profile in near real-time, and
communicate, to the generator, a second command for the generator to output the identified second generator output.

17. The controller of claim 16, wherein the threshold condition corresponds to a temperature threshold.

18. The controller of claim 16, wherein the threshold condition corresponds to a current threshold.

19. The controller of claim 16, wherein the voltage control loop is processed at a first frequency and the current control loop is processed at a second frequency, wherein the battery module is charged to a desired voltage level, while controlling the battery charging current and keeping the voltage at a voltage set point after an initial ramp up period.

20. The controller of claim 19, wherein the plurality of sensed signals is sensed using a smart sensor installed adjacent to the battery module, and wherein the smart sensor communicates a message to the controller including a state of charge of the battery module calculated using the plurality of sensed signals.

* * * * *